(12) United States Patent
Takahashi

(10) Patent No.: US 9,112,726 B2
(45) Date of Patent: Aug. 18, 2015

(54) DATA TRANSFER SYSTEM AND DATA TRANSFER METHOD

(75) Inventor: Eiji Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 476 days.

(21) Appl. No.: 12/743,945

(22) PCT Filed: Nov. 26, 2008

(86) PCT No.: PCT/JP2008/071428
§ 371 (c)(1),
(2), (4) Date: May 20, 2010

(87) PCT Pub. No.: WO2009/069645
PCT Pub. Date: Jun. 4, 2009

(65) Prior Publication Data
US 2010/0312911 A1    Dec. 9, 2010

(30) Foreign Application Priority Data

Nov. 26, 2007  (JP) ................................ 2007-304382

(51) Int. Cl.
*G06F 15/173* (2006.01)
*H04L 12/54* (2013.01)
*H04L 12/18* (2006.01)
*H04L 12/729* (2013.01)
*H04L 12/761* (2013.01)
(Continued)

(52) U.S. Cl.
CPC ............ *H04L 12/56* (2013.01); *H04L 12/1877* (2013.01); *H04L 45/125* (2013.01); *H04L 45/16* (2013.01); *H04L 43/0888* (2013.01); *H04L 45/48* (2013.01)

(58) Field of Classification Search
CPC .... H04L 45/48; H04L 43/0888; H04L 45/125
See application file for complete search history.

(56) References Cited

U.S. PATENT DOCUMENTS 5,940,391 A * 8/1999 Malkin et al. ................. 370/390
6,523,069 B1 * 2/2003 Luczycki et al. ............. 709/249
6,981,052 B1 * 12/2005 Cheriton ....................... 709/232
(Continued)

FOREIGN PATENT DOCUMENTS

JP    56-110370    9/1981
JP    2000-270010  9/2000
(Continued)

OTHER PUBLICATIONS

International Search Report, PCT/JP2008/071428, Dec. 22, 2008.

*Primary Examiner* — Suraj Joshi
(74) *Attorney, Agent, or Firm* — Young & Thompson

(57) ABSTRACT

A data transfer system of this invention includes a plurality of transfer apparatuses (11-14) and a control apparatus (10). On condition that data transfer to a transfer apparatus of a transmission destination is completed before a requested transfer completion time, the control apparatus (10) builds a data transfer tree serving as a data transfer path from a transfer apparatus of a transmission source to the transfer apparatus of the transmission destination. Each of the transfer apparatuses (11-14) transfers data in accordance with the tree. This allows to guarantee to complete transfer to transfer apparatuses of a plurality of transmission destinations up to a requested transfer completion time even when a transfer apparatus of one transmission source transfers a file to the transfer apparatuses of the plurality of transmission destinations by multicast.

5 Claims, 4 Drawing Sheets

(51) Int. Cl.
*H04L 12/753* (2013.01)
*H04L 12/26* (2006.01)

(56) References Cited

U.S. PATENT DOCUMENTS

2006/0136970 A1* 6/2006 Salomons .................. 725/81
2008/0040501 A1* 2/2008 Harrang et al. ............... 709/232
2008/0175269 A1* 7/2008 Alvarez et al. ................ 370/468

FOREIGN PATENT DOCUMENTS

| JP | 2001-237886 | 8/2001 |
| JP | 2005-244880 | 9/2005 |
| JP | 2007-235681 | 9/2007 |

* cited by examiner

| TRANSFER APPARATUS ID | 11 | 12 | 13 | 14 |
|---|---|---|---|---|
| 11 |  | 40 | 10 | 50 |
| 12 | 10 |  | 50 | 40 |
| 13 | 10 | 50 |  | 20 |
| 14 | 50 | 20 | 30 |  |
F I G. 7
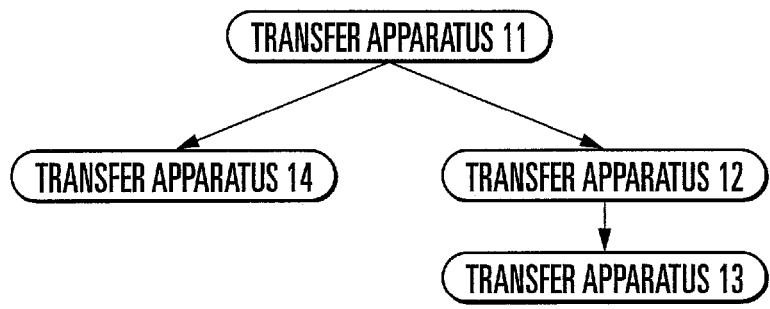
F I G. 8
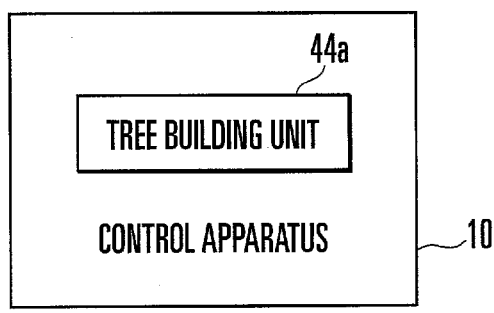
F I G. 9

DATA TRANSFER SYSTEM AND DATA TRANSFER METHOD

TECHNICAL FIELD

The present invention relates to a data transfer system and a data transfer method

BACKGROUND ART

A communication network represented by the Internet provides a best-effort service. That is, when communication traffic passing through a network resource (transmission channel bandwidth) exceeds the sum of bandwidths, the transfer rate is not guaranteed.

Hence, when transferring a file, it is difficult to predict the file transfer time (the time necessary from the start of file transfer from a transfer apparatus of a transmission source to the end of file transfer at a transfer apparatus of a transmission destination).

To solve this problem, a method is used in which a requested transfer completion time is designated in advance for file transfer, and transfer control is performed to complete the file transfer up to the designated requested transfer completion time. This method is disclosed in, for example, reference 1 (Japanese Patent Laid-Open No. 2001-237886), reference 2 (Japanese Patent Laid-Open No. 2000-270010), and reference 3 (Japanese Patent Laid-Open No. 2005-244880).

DISCLOSURE OF INVENTION

Problem to be Solved by the Invention

The above-described transfer control method based on the requested transfer completion time supports only transfer by unicast. When a transfer apparatus of one transmission source transfers a file to transfer apparatuses of a plurality of transmission destinations by multicast, the transfer control cannot be done to complete the file transfer up to the designated requested transfer completion time.

The present invention has been made to solve the above-described problem, and has as its exemplary object to provide a data transfer system and a data transfer method which can guarantee to complete transfer to a plurality of receiving apparatuses up to a requested transfer completion time even when a transfer apparatus of one transmission source transfers a file to transfer apparatuses of a plurality of transmission destinations by multicast.

Means of Solution to the Problem

A data transfer system according to an exemplary aspect of the invention includes a plurality of transfer apparatuses which are connected to each other via a network to transfer data, and a control apparatus including tree building means for building, on condition that data transfer from a transfer apparatus of a transmission source to a transfer apparatus of at least one transmission destination is completed before a requested transfer completion time predetermined for each data, a data transfer tree serving as a data transfer path from the transfer apparatus of the transmission source to the transfer apparatus of the transmission destination.

A data transfer method according to another exemplary aspect of the invention includes the steps of building, on condition that data transfer from a transfer apparatus of a transmission source to a transfer apparatus of at least one transmission destination is completed before a requested transfer completion time predetermined for each data, a data transfer tree serving as a data transfer path from the transfer apparatus of the transmission source to the transfer apparatus of the transmission destination, and causing a transfer apparatus on the data transfer path to transfer data in accordance with the data transfer tree.

Effect of the Invention

According to the present invention, it is possible to guarantee to complete transfer to transfer apparatuses of a plurality of transmission destinations up to a requested transfer completion time even when a transfer apparatus of one transmission source transfers a file to the transfer apparatuses of the plurality of transmission destinations by multicast.

BRIEF DESCRIPTION OF DRAWINGS

FIG. 7 is a view showing the throughputs between transfer apparatuses;

FIG. 8 is a view showing a built tree; and

FIG. 9 is a block diagram showing another arrangement of the control apparatus.

BEST MODE FOR CARRYING OUT THE INVENTION

Exemplary Embodiment of Present Invention

An exemplary embodiment of the present invention will now be described in detail with reference to the accompanying drawings.

(Description of Arrangement)

Figure 1:
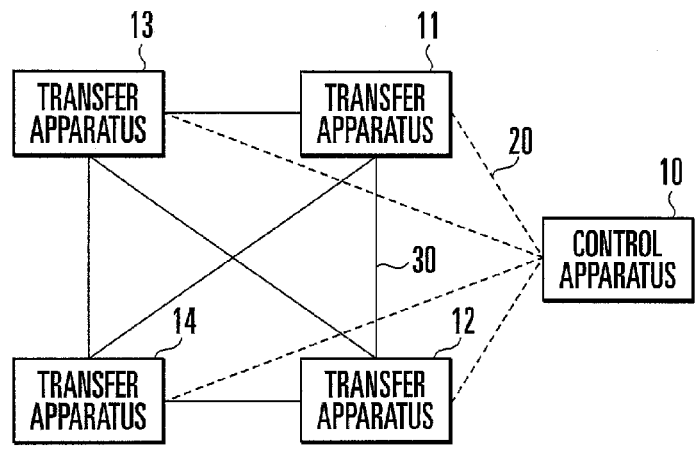
FIG. 1 is a block diagram showing the arrangement of a data transfer system according to an exemplary embodiment of the present invention.

FIG. 1 is a block diagram showing the arrangement of a data transfer system according to an exemplary embodiment of the present invention. The data transfer system includes a plurality of transfer apparatuses 11, 12, 13, and 14, and a control apparatus 10. Broken lines 20 represent the communication lines between the control apparatus 10 and the transfer apparatuses 11 to 14. Solid lines 30 represent the communication lines between the transfer apparatuses 11 to 14. The transfer apparatuses 11 to 14 and the control apparatus 10 are arranged on a communication network.

Each of the transfer apparatuses 11 to 14 measures the load of its own and the load of the communication network, and notifies the control apparatus 10 of them. Each of the transfer apparatuses 11 to 14 also accumulates data in accordance with an instruction from the control apparatus 10, and transfers the data to the others of the transfer apparatuses 11 to 14.

Based on the information received from the transfer apparatuses 11 to 14, the control apparatus 10 builds a data transfer rate and a data transfer tree based on the information notified from the transfer apparatuses 11 to 14, and sends the information of the transfer rate and the data transfer tree to the transfer apparatuses 11 to 14.

Figure 2:
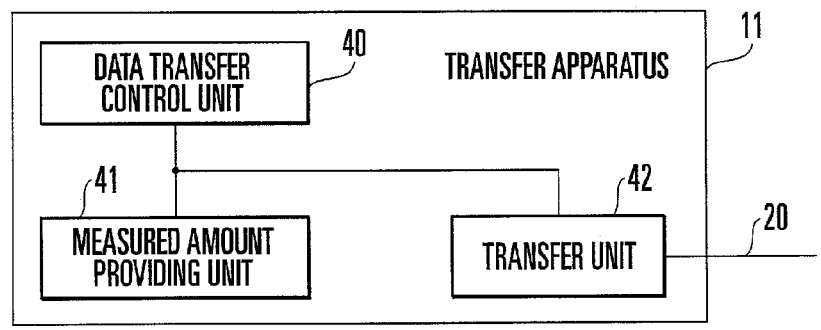
FIG. 2 is a block diagram showing the arrangement of a transfer apparatus.

FIG. 2 is a block diagram showing the arrangement of the transfer apparatus 11 shown in FIG. 1. Note that the remaining transfer apparatuses 12 to 14 also have the same arrangement.

The transfer apparatus 11 includes a data transfer control unit 40, measured amount providing unit 41, and transfer unit 42. The data transfer control unit 40 determines the data transmission order based on the state of the transfer apparatus and the states of the communication lines on condition that data is transferred to a target receiving apparatus before a requested transfer completion time. The measured amount providing unit 41 provides a measured amount representing the state of the communication network and a measured amount representing the state of the transfer apparatus. The transfer unit 42 accumulates data in accordance with data transfer control performed by the data transfer control unit 40 (i.e., in accordance with the schedule), and then reads out the data and transfers them to the communication line 20. Note that the state of the communication network includes the states of the communication lines.

In FIG. 2, the data transfer control unit 40 and the measured amount providing unit 41 are provided outside the transfer unit 42 for the descriptive convenience. However, the transfer unit 42 may include the data transfer control unit 40 and the measured amount providing unit 41 as internal functions.

Figure 3:
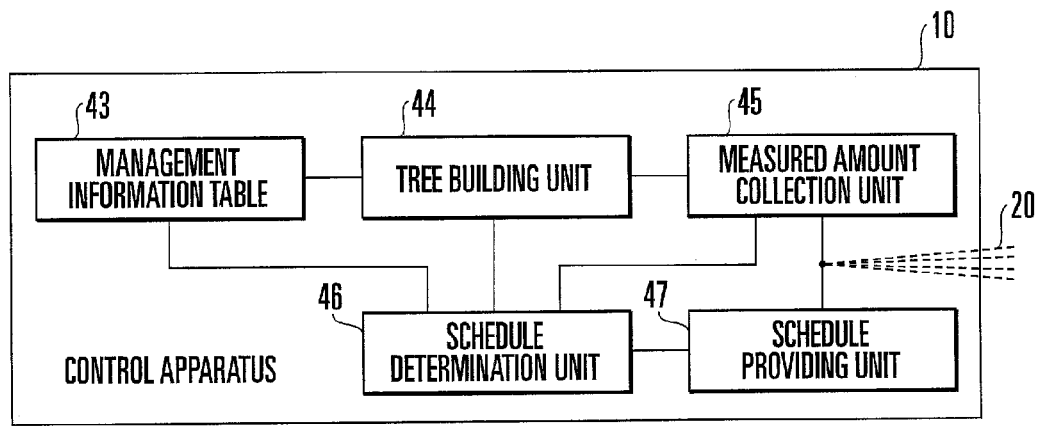
FIG. 3 is a block diagram showing an arrangement of a control apparatus.

FIG. 3 is a block diagram showing an arrangement of the control apparatus 10 shown in FIG. 1. The control apparatus 10 includes a management information table 43, tree building unit 44, measured amount collection unit 45, schedule determination unit 46, and schedule providing unit 47.

The management information table 43 stores a data transfer schedule, the measured amount representing the state of the transfer apparatus, and the measured amount representing the state of the communication network.

On condition that data transfer from a transfer apparatus of a transmission source to a transfer apparatus of at least one transmission destination is completed before a requested transfer completion time predetermined for each data, the tree building unit 44 builds a data transfer tree serving as a data transfer path from the transfer apparatus of the transmission source to the transfer apparatus of the transmission destination based on the states of the transfer apparatuses 11 to 14 and the states of the communication lines 20.

The measured amount collection unit 45 collects a measured amount representing the state of the communication network and measured amounts representing the states of the transfer apparatuses 11 to 14.

The schedule determination unit 46 determines the data transfer schedules of the transfer apparatuses 11 to 14 in accordance with the data transfer tree built by the tree building unit 44. The data transfer schedule includes a file ID, tree information, and minimum throughput (minimum transfer rate). The minimum throughput is determined for each tree on condition that data transfer from a transfer apparatus of a transmission source to a transfer apparatus of at least one transmission destination is completed before a requested transfer completion time predetermined for each data. Hence, the schedule determination unit 46 also functions as a minimum transfer rate setting unit.

The schedule providing unit 47 provides, to the transfer apparatuses 11 to 14, the data transfer schedules of the transfer apparatuses 11 to 14 determined by the schedule determination unit 46. Hence, the schedule providing unit 47 also functions as an information distribution unit which distributes tree information and minimum throughput included in a data transfer schedule to a transfer apparatus included in the tree.

(Description of Operation)

Figure 4:
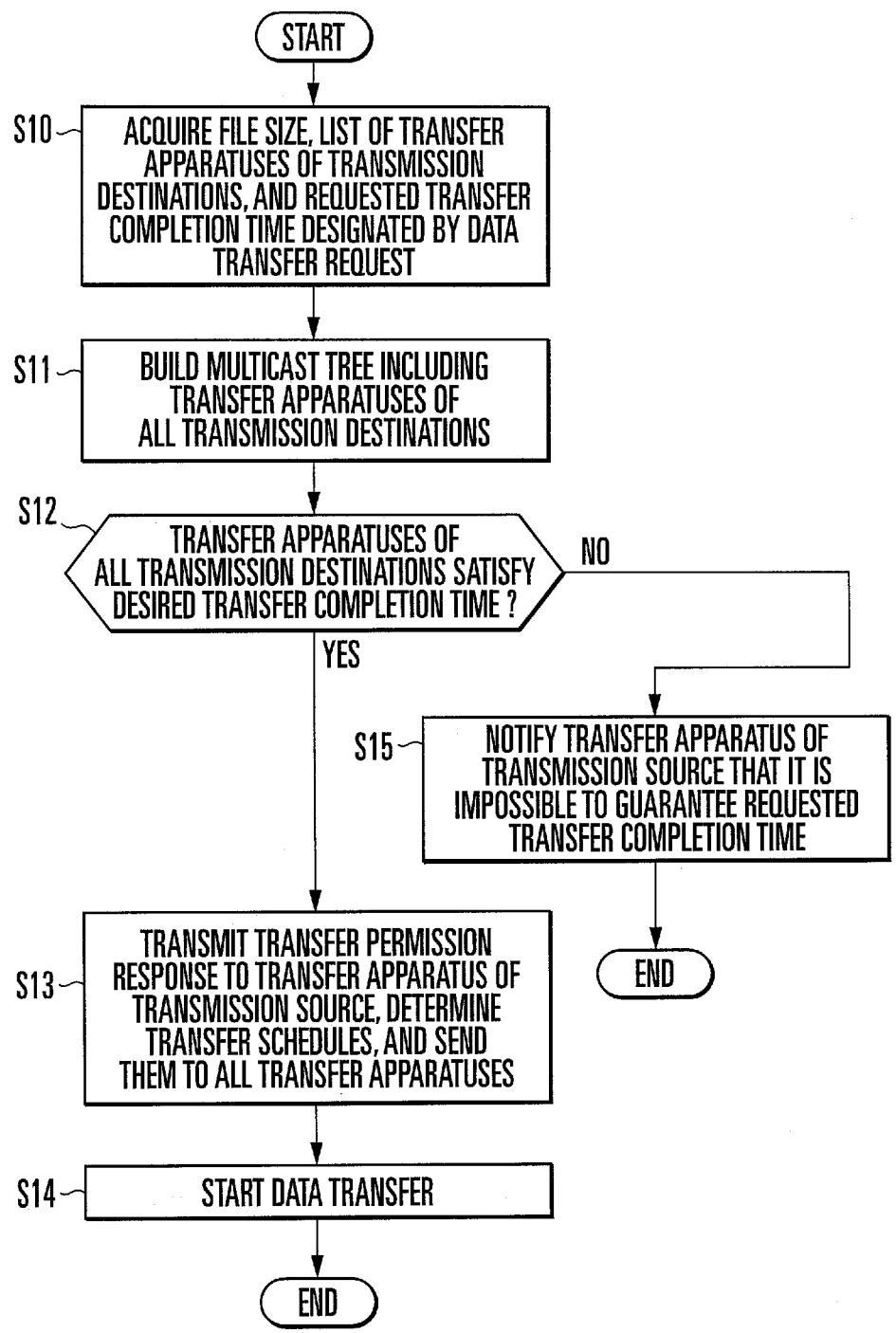
FIG. 4 is a flowchart illustrating a processing procedure when a data transfer request is generated.

The operation of the data transfer system shown in FIG. 1 will be described next with reference to FIG. 4. FIG. 4 is a flowchart illustrating a processing procedure when a data transfer request is generated.

When the transfer apparatus 11 generates a request to transfer a file i to the transfer apparatuses 12 to 14, the control apparatus 10 acquires the file size, the list of transmission destination transfer apparatuses (the transfer apparatuses 12 to 14 in this case), and the requested transfer completion time designated by the transfer request (step S10).

The control apparatus 10 builds a multicast tree including the transfer apparatus of the transmission source (the transfer apparatus 11 in this case) and the transfer apparatuses of all transmission destinations (the transfer apparatuses 12 to 14 in this case) (step S11). The tree building is done by the tree building unit 44. A detailed method of building a tree will be explained later.

The control apparatus 10 calculates the predicted transfer completion time of each of the transfer apparatuses 12 to 14 of the transmission destinations, and confirms whether the requested transfer completion time can be satisfied (step S12). If the requested transfer completion time can be satisfied in step S12 (YES in step S12), the process advances to step S13. If the requested transfer completion time cannot be satisfied (NO in step S12), the process advances to step S15.

If the requested transfer completion time can be satisfied, the control apparatus 10 transmits a transfer permission response to the transfer apparatus 11 of the transmission source, determines the transfer schedules and sends them to all the transfer apparatuses 11 to 14 included in the tree (step S13). Each transfer schedule includes a file ID, tree information, and minimum throughput. The transfer schedule determination is done by the schedule determination unit 46.

When sending of the transfer schedules is completed, the control apparatus 10 updates the data transfer schedules, the measured amounts representing the states of the transfer apparatuses 11 to 14, the measured amount representing the state of the communication network, which are stored in the management information table 43.

Upon receiving the transfer schedule from the transfer apparatus 11, the transfer unit 42 of each of the transfer apparatuses 11 to 14 starts transfer based on the schedule (step S14). More specifically, upon receiving data, a transfer apparatus n (n is one of 12 to 14) confirms the ID of the data, and transfers the data to a next transfer apparatus m (m is one of 12 to 14, for n≠m) based on the tree information.

Figure 5:
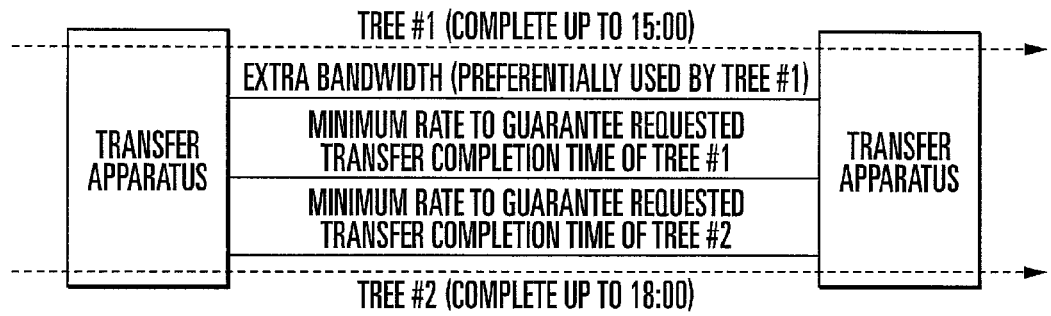
FIG. 5 is a view for explaining how to use an extra bandwidth.

Each of the transfer apparatuses 11 to 14 transfers each data while maintaining the minimum throughput designated for the data. If the sum of the minimum throughputs of all trees under transfer is smaller than the sum of those of the communication lines, an extra bandwidth is generated in the communication lines of the communication network. The extra bandwidth is preferentially used for data transmission of a tree with an earliest requested transfer completion time, as shown in FIG. 5. The data transfer is done by causing the data transfer control unit 40 to control the transfer unit 42.

In the example shown in FIG. 5, the requested transfer completion time of tree #1 is 15:00, and the requested transfer completion time of tree #2 is 18:00. In this case, since the requested transfer completion time of tree #1 is earlier than that of tree #2, tree #1 preferentially uses the extra bandwidth.

When transferring data, the transfer unit 42 of each of the transfer apparatuses 11 to 14 starts data reception from an upstream transfer apparatus, and almost simultaneously starts transfer to a downstream transfer apparatus along the tree.

When the data transfer is completed, the control apparatus 10 updates the data transfer schedules, the measured amounts representing the states of the transfer apparatuses 11 to 14, and the measured amount representing the state of the communication network, which are stored in the management information table 43.

Note that if the requested transfer completion time cannot be satisfied in step S12, the control apparatus 10 notifies the transfer apparatus 11 of the transmission source that it is impossible to guarantee the requested transfer completion time (step S15).

Figure 6:
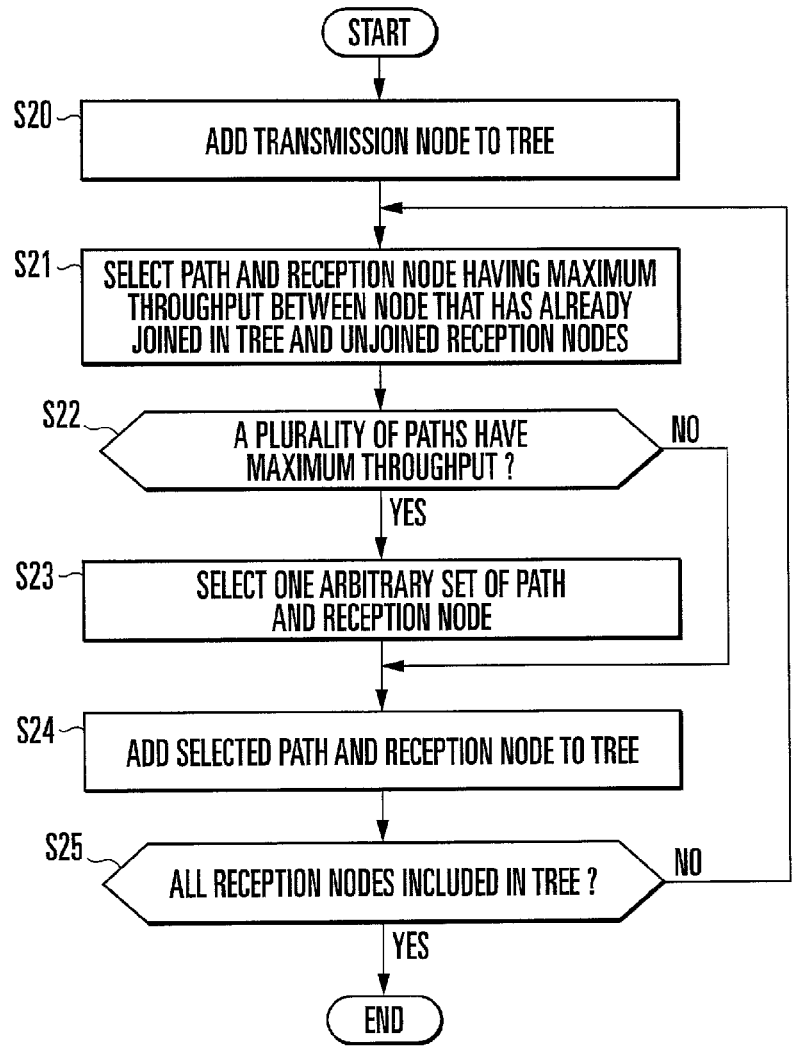
FIG. 6 is a flowchart illustrating a processing procedure of tree building by the control apparatus.

A processing procedure of tree building by the control apparatus 10 in step S11 will be described next with reference to FIG. 6. FIG. 6 is a flowchart illustrating the processing procedure of tree building by the control apparatus 10. First, a transmission node (transfer apparatus 11) is added to a tree (step S20).

Subsequently, a path and a reception node having a maximum throughput between the node that has already joined in the tree and unjoined reception nodes are selected (step S21). In this case, the node that has joined in the tree corresponds to the transfer apparatus 11, and the unjoined reception nodes correspond to the transfer apparatuses 12 to 14.

The value of a bandwidth on the communication network usable in tree building is obtained by calculating an extra bandwidth based on the data transfer schedules, the measured amounts representing the states of the transfer apparatuses 11 to 14, and the measured amount representing the state of the communication network, which are stored in the management information table 43.

If a plurality of paths having a maximum throughput have been selected in step S21 (YES in step S22), an arbitrary set of a path and a reception node is selected (step S23). The selected path and reception node are added to the tree (step S24).

If not all reception nodes are included in the tree in step S25 (NO in step S25), the process returns to step S21. On the other hand, if all reception nodes are included in the tree (YES in step S25), the tree building ends.

An example of tree building will be described next in detail with reference to FIGS. 7 and 8. FIG. 7 is a view showing the throughputs between the transfer apparatuses 11 to 14. Transmission source transfer apparatus IDs are shown on the left side, and transmission destination transfer apparatus IDs are shown on the right side. For example, the throughput from the transfer apparatus 11 to the transfer apparatus 12 is "40". The information shown in FIG. 7 is stored in the management information table 43. FIG. 8 is a view showing a built tree.

The control apparatus 10 first searches the transfer apparatuses 12 to 14 connected to the transfer apparatus 11 of the transmission source for a transfer apparatus with a maximum throughput by looking up the table in FIG. 7. As is apparent from FIG. 7, the maximum throughput is "50" from the transfer apparatus 11 to the transfer apparatus 14. Hence, the transfer apparatus 14 is added on the downstream side of the transfer apparatus 11, as shown in FIG. 8.

Next, the control apparatus 10 searches for a combination of a transmission source transfer apparatus and a transmission destination transfer apparatus having a maximum throughput from the transfer apparatuses 11 and 14 already added to the tree to the transfer apparatuses 12 and 13 by looking up the table in FIG. 7. As is apparent from FIG. 7, the maximum throughput is "40" from the transfer apparatus 11 to the transfer apparatus 12. Hence, the transfer apparatus 12 is added on the downstream side of the transfer apparatus 11, as shown in FIG. 8.

Furthermore, the control apparatus 10 searches for a combination of a transmission source transfer apparatus and a transmission destination transfer apparatus having a maximum throughput from the transfer apparatuses 11, 12, and 14 already added to the tree to the transfer apparatus 13 by looking up the table in FIG. 7. As is apparent from FIG. 7, the maximum throughput is "50" from the transfer apparatus 12 to the transfer apparatus 13. Hence, the transfer apparatus 13 is added on the downstream side of the transfer apparatus 12, as shown in FIG. 8.

Effects of Exemplary Embodiment

As described above, according to the exemplary embodiment, it is possible to complete data transfer to transfer apparatuses of a plurality of transmission destinations designated for each data before a requested transfer completion time predetermined for each data. In addition, a tree serving as a file transfer path is build such that the transfer is completed sequentially from the upstream side of the tree. This increases the probability that a transfer apparatus can receive the next file transfer request, and enables effective use of facilities.

Other Exemplary Embodiments

In the above-described exemplary embodiment, if it is determined in step S12 that the requested transfer completion time cannot be satisfied, the process advances to step S15 to notify the transfer apparatus that it is impossible to guarantee the requested transfer completion time. Instead, a list of nodes that can guarantee the requested transfer completion time may be sent so that data transfer can be completed up to the requested transfer completion time for only the nodes that can guarantee it.

This can prevent data transfer from not being done in time for the transfer apparatuses of all transmission destinations because data transfer cannot be done in time for the transfer apparatuses of some transmission destinations.

In the above exemplary embodiment, an example in which the control apparatus 10 includes the functional units 43 to 47 has been described. However, as shown in FIG. 9, the control apparatus 10 need only include a tree building unit 44a which builds, on condition that data transfer from a transfer apparatus of a transmission source to a transfer apparatus of at least one transmission destination is completed before a requested transfer completion time predetermined for each data, a data transfer tree serving as a data transfer path from the transfer apparatus of the transmission source to the transfer apparatus of the transmission destination.

Exemplary Embodiment of Program

The functions of the above-described control apparatus 10 and transfer apparatuses 11 to 14 can also be implemented by operating information processing apparatuses in accordance with programs.

A program for a control apparatus is installed in an information processing apparatus. The information processing apparatus operates in accordance with the program for a control apparatus, thereby implementing the functions of the management information table 43, tree building unit 44, measured amount collection unit 45, schedule determination unit 46, and schedule providing unit 47 of the above-described control apparatus 10. In addition, a program for a transfer apparatus is installed in an information processing apparatus. The information processing apparatus operates in accordance with the program for a transfer apparatus, thereby implementing the data transfer control unit 40, measured amount providing unit 41, and transfer unit 42 of each of the above-described transfer apparatuses 11 to 14.

The program for a control apparatus and that for a transfer apparatus can be recorded in a mechanically readable recording medium and provided. The information processing apparatus can install each program from the recording medium. The information processing apparatus can also install each program directly from a server that holds the program via a network.

Note that the programs of the exemplary embodiment include not only a program directly executable by an information processing apparatus but also a program that becomes executable upon being installed in a hard disk or the like. A compressed or encrypted program is also included.

While the invention has been particularly shown and described with reference to exemplary embodiments thereof, the invention is not limited to these embodiments. It will be understood by a person of ordinary skill in the art that various changes in form and details may be made therein without departing from the spirit and scope of the present invention as defined by the claims.

INDUSTRIAL APPLICABILITY

According to the present invention, it is possible to guarantee to complete transfer to transfer apparatuses of a plurality of transmission destinations up to a requested transfer completion time even when a transfer apparatus of one transmission source transfers a file to the transfer apparatuses of the plurality of transmission destinations by multicast. This allows to improve the service quality of a data transfer service.

This application is based upon and claims the benefit of priority from Japanese patent application No. 2007-304382, filed on Nov. 26, 2007, the disclosure of which is incorporated herein in its entirety by reference.

The invention claimed is:

1. A data transfer system, comprising:
  a plurality of transfer apparatuses, connected to each other to transfer data via a network of communication lines; and
  a control apparatus, in connection with the network, comprising an information processor and a non-transitory memory device having stored thereon instructions for causing the information processor to operate as
    a tree building unit configured to build a data transfer tree to satisfy a condition wherein data transfer from a transfer apparatus of a transmission source on the network to a transfer apparatus of at least one transmission destination on the network is completed in less time than a requested transfer completion time predetermined for each data, the data transfer tree corresponding to a data transfer path from the transfer apparatus of the transmission source to the transfer apparatus of the transmission destination,
    a minimum transfer rate setting unit configured to determine a minimum transfer rate for each data transfer tree so as to satisfy the condition, and
    an information distribution unit configured to distribute the data transfer tree and the minimum transfer rate to the transfer apparatuses included in the data transfer tree,
  wherein each of said transfer apparatuses comprise a transfer unit configured to distribute the data in accordance with the data transfer tree and the minimum transfer rate so as to satisfy the condition, and
  wherein each of said transfer apparatuses further comprise a data transfer control unit configured to control said transfer unit so as to, if an extra bandwidth is determined to exist in a communication line of the network, use the extra bandwidth for transfer of data with an earliest requested transfer completion time, said extra bandwidth being determined in a case where a sum of minimum throughputs of all data transfer trees under transfer via the transfer apparatuses is smaller than a sum of minimum throughputs of the communication lines of the network, wherein said transfer unit starts data reception from an upstream transfer apparatus, and simultaneously starts transfer to a downstream transfer apparatus.

2. The data transfer system according to claim 1, wherein said tree building unit sequentially selects a path between said transfer apparatuses based on a magnitude of a throughput.

3. The data transfer system according to claim 2, wherein said control apparatus further comprises a management information table which stores information representing a throughput of a path between said transfer apparatuses, and
  said tree building unit comprises:
    a unit configured to add the transfer apparatus of the transmission source to the data transfer tree; and
    a unit configured to add, to the data transfer tree, a path and a transfer apparatus having a maximum throughput to a joined transfer apparatus having been added to the data transfer tree by looking up said management information table, and arranges the path and the transfer apparatus on a downstream side of the joined transfer apparatus.

4. The data transfer system according to claim 1, wherein the control apparatus is configured to determine whether the requested transfer completion time can be satisfied, and upon a determination the requested transfer completion time cannot be satisfied, the control apparatus notifies the transfer apparatus of the transmission source with a notification indicating the requested transfer completion time cannot be guaranteed.

5. A transfer apparatus configured to transfer data to another apparatus connected to the transfer apparatus via a network, comprising:
  an information processor and a non-transitory memory device having stored thereon instructions for causing the information processor to operate as a transfer unit and a data transfer control unit,
  the transfer unit configured to, when a data transfer from a transfer apparatus of a transmission source on the network to a transfer apparatus of at least one transmission destination on the network is completed in less time than a predetermined requested transfer completion time for each data, transfer the data in accordance with a data transfer tree corresponding to a data transfer path from the transfer apparatus of the transmission source to the transfer apparatus of the transmission destination and a minimum transfer rate determined for each data transfer tree, the data transfer tree containing information sufficient to satisfy the condition, and
  the data transfer control unit configured to control said transfer unit so as to, if an extra bandwidth is determined to exist in a communication line of the network, use the extra bandwidth for transfer of data with an earliest requested transfer completion time, said extra bandwidth being determined in a case where a sum of minimum throughputs of all data transfer trees under transfer via the transfer apparatuses is smaller than a sum of minimum throughputs of the communication lines of the network, wherein said transfer unit starts data reception from an upstream transfer apparatus, and simultaneously starts transfer to a downstream transfer apparatus.

\* \* \* \* \*